Aug. 26, 1958  A. WEISS  2,849,110
CONTAINER COUPLER
Filed Dec. 2, 1952  3 Sheets-Sheet 2
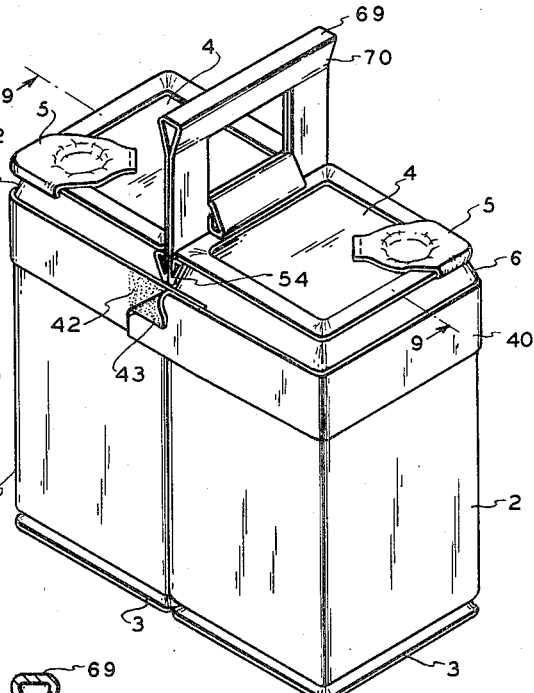
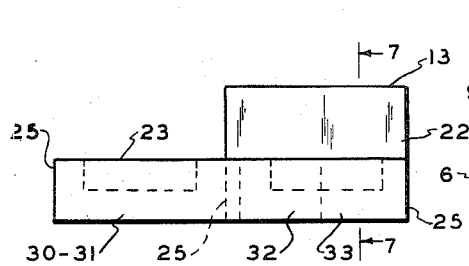
Fig. 6
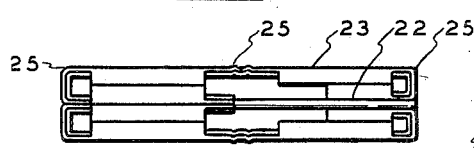
Fig. 6a
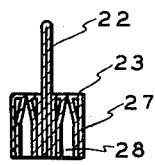
Fig. 7
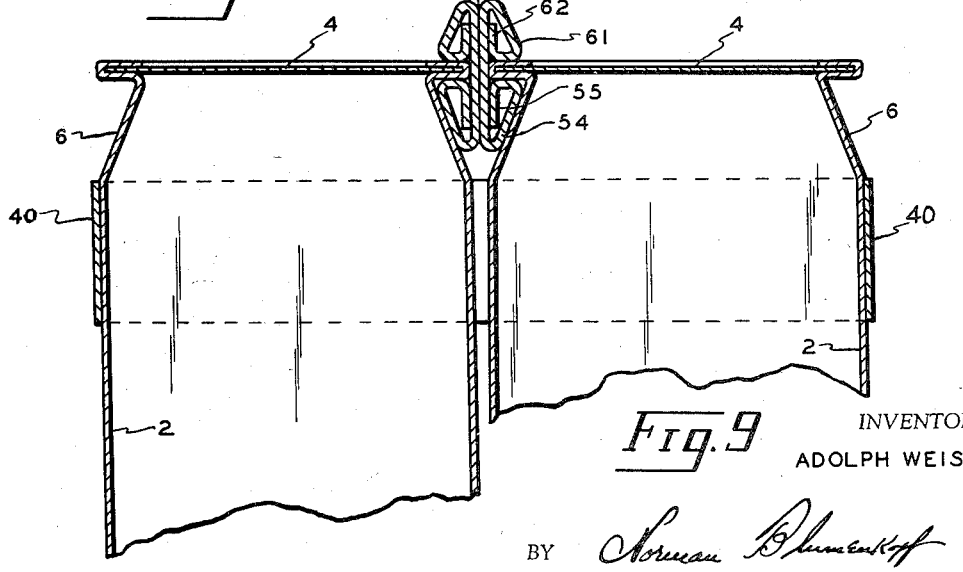
Fig. 9
INVENTOR
ADOLPH WEISS
BY Norman Blumenkopf
ATTORNEY

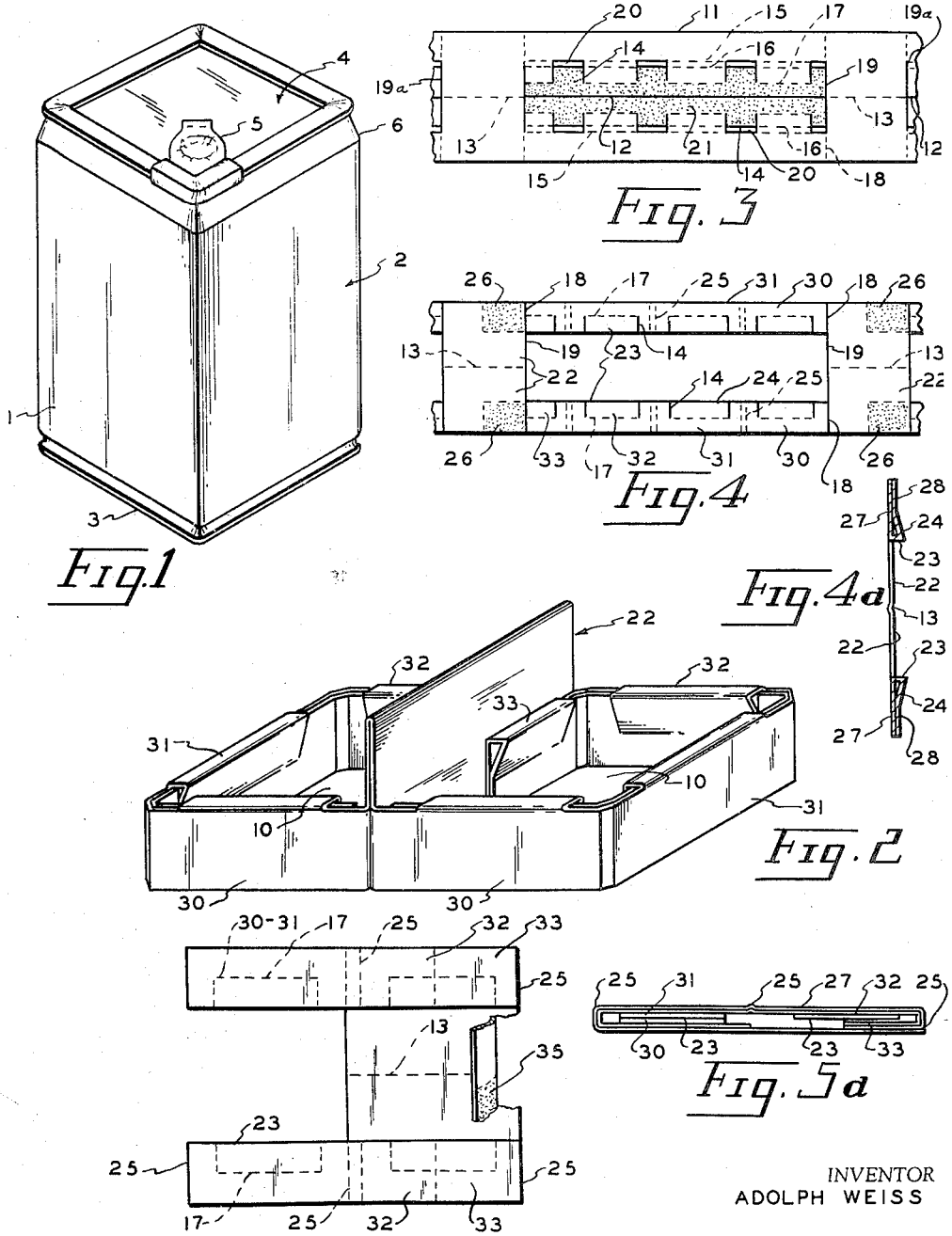

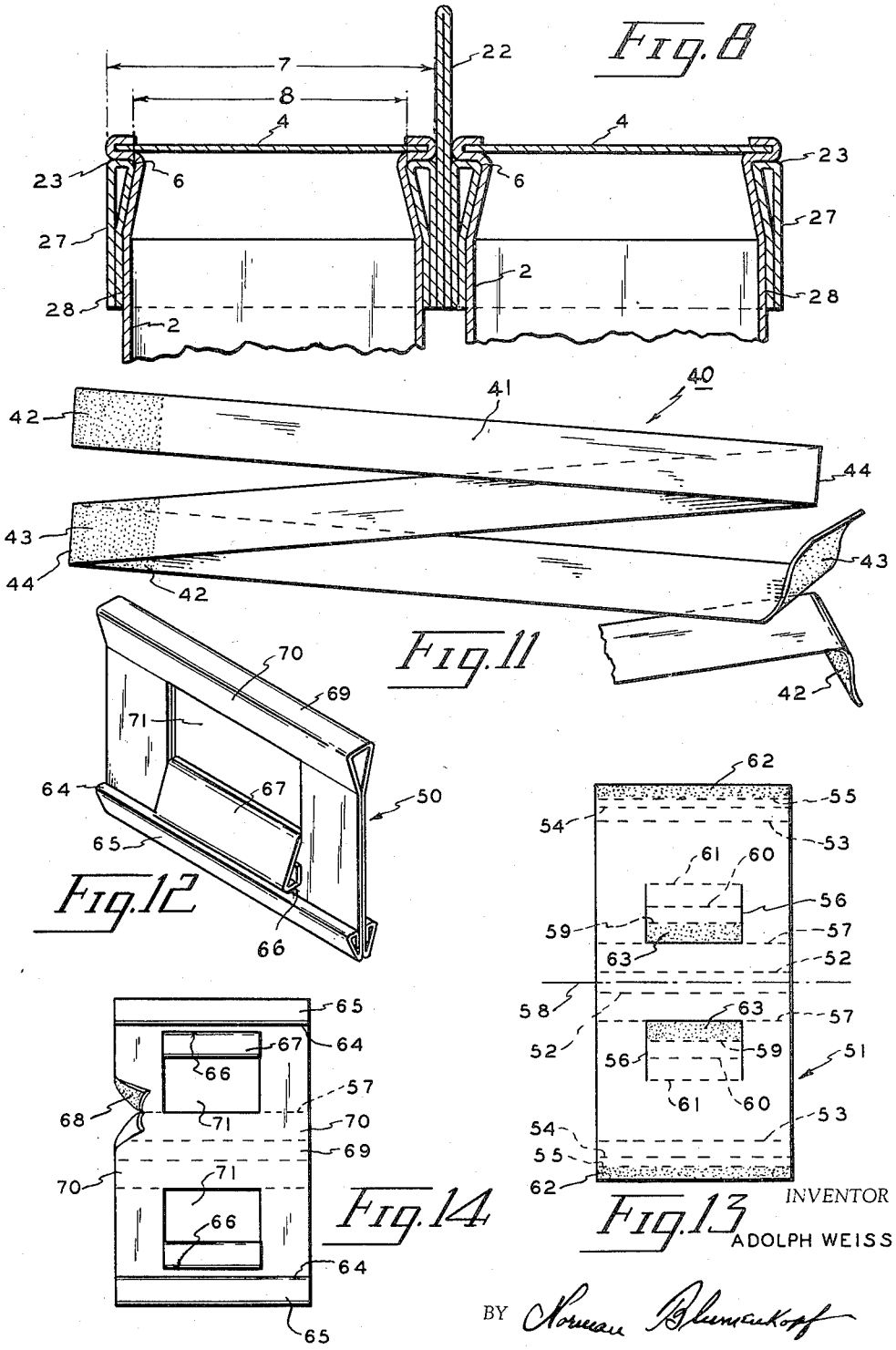

United States Patent Office 2,849,110
Patented Aug. 26, 1958

2,849,110

CONTAINER COUPLER

Adolph Weiss, Brooklyn, N. Y., assignor to American Can Company, New York, N. Y., a corporation of New Jersey Application December 2, 1952, Serial No. 323,545

5 Claims. (Cl. 206—65)

This invention relates to new and useful couplers for paper milk cartons or containers and methods of making same. More particularly, this invention relates to new and useful carriers adaptable to couple two individual quart sized paper milk cartons or containers into a unitary package and methods of making same.

The quart size milk bottle and container are well known and well established units for the distribution of milk for domestic consumption by dairies and package stores. However, the milk consumption of a very large percentage of households exceeds that of a single quart and makes distribution by a larger unit desirable. Consequently half gallon bottles were introduced for that purpose. They have not met with public approval for the reasons that they are too bulky, too heavy for handling by children and they are responsible for spoilage of milk when the bottle is not rapidly consumed.

The manufacture and purchase of a multiple number of single quart containers is more economical and practical, in fact in many cases there is a price advantage for the purchase of two single quart containers to boost these sales. The handling of a pair of containers is cumbersome and requires an improvement to facilitate handling by the dairies, distributors and consumers.

An object of this invention is to provide a means suitable for coupling a pair of milk cartons or containers into a unitary package, convenient for handling up to the point of arrival at the premises of the consumer where it may then be divided into individual units, thus facilitating easier handling and more convenient consumption.

Another object of this invention is to provide a means suitable for coupling or banding together a pair of quart milk cartons or containers into a unitary package and providing a safe and convenient means for carrying the coupled container unit.

A further object of this invention is to provide a coupler of low material cost and designed to permit easy, simple and inexpensive fabrication so that it may be marketed at a very low price. Furthermore, its structural features are such that the coupling operation may be carried out manually at fair volume and without skill or by automatic means at accelerated volume requiring only inexpensive equipment.

Other objects and advantages of the invention will become apparent to those skilled in the art upon a full understanding of the following detailed description taken in connection with the accompanying drawings wherein satisfactory embodiments of the invention are shown.

The various embodiments are presented herein for the purpose of exemplification, but it will be appreciated that the invention is susceptible of incorporation in other modified forms coming equally within the scope of the appended claims.

In the drawings—

Fig. 1 illustrates a paper milk carton for which this invention is intended.

Fig. 2 is a perspective view illustrating one form of my coupler in its completed form.

Figs. 3 to 7, inclusive, illustrate the successive steps in the fabrication of the coupler of Fig. 2.

Fig. 8 is a fragmentary sectional view of an assembled package of a pair of milk cartons and the coupler of Fig. 2.

Fig. 9 is a fragmentary sectional view taken along lines 9—9 of Fig. 10.

Fig. 10 is a perspective view illustrating another embodiment of the present invention including a pair of milk cartons and the second form of my coupler.

Fig. 11 illustrates one element of the second form of my coupler.

Fig. 12 is a perspective view of the second element of the second form of my coupler.

Fig. 13 is a top plan view of a step in the fabrication of the element illustrated in Fig. 12.

Fig. 14 is a top plan view of a further step in the fabrication of the element illustrated in Fig. 12.

The paper milk cartons (Figs. 1 and 10) designated by the numeral 1 comprise the vertical walls 2 which are capped by the bottom panel 3 and the top panel 4. The latter is provided with a hinged closure plug 5.

For the purpose of higher rigidity and of a leakproof seal, the upper extremities of the panels 2 are bent inwardly and then outwardly again forming the triangular indentation 6. The horizontal ledge of formation 6 functions as the bottom seat for the top panel 4. The remaining portions of the panels 2 are next crimped around and over the top panel 4 and firmly joined therewith. This type of fibre milk container has been marketed successfully for many years and is covered by J. M. Hothersall Patent No. 2,085,979, dated July 6, 1937.

My first form of coupler designated by the numeral 10 (Figs. 2 and 8) is fabricated from a lightweight paper board, approximately .04" thickness as a continuous ribbon supplied in web form from a supply roll. The various operations are carried out in proper sequence until the partly completed and endmost unit is severed from the main stock and individually completed.

The web material 11 (Fig. 3) in the initial operations is provided with a longitudinal slit 12 which divides the paper into two halves. On the opposite halves of the panels formed by the slit 12 are provided several slits 14 which are at right angles to the slit 12 and which are connected by the respective creases 15, 16 and 17 being parallel to the slit 12. Where the lines 15 and 16 run through the slits 14 they form the openings 20.

The slit 12 starts at the cut-off line 19a of a single blank and terminates in the slit 19 which is at right angles thereto and which beyond the opening 20 continues as respective creases 18. Between the slit 19 and the next cut-off line is the panel 22 which contains the central crease 13 constituting a horizontal continuity of the slit 12.

The adjoining portions of the sections bisected by the slit 12 and bordering with lines 14, 17, 19, 19a and 20 are coated with an adhesive film 21.

In the next operational sequence (Figs. 4 and 4a) the opposite halves bisected by the slit 12 are bent in opposite directions on the crease line 16 and are adhesively joined to form a pair of two-ply U-shaped extensions of the panel 22. The said extensions comprise the outer wall 27 integral with panel 22 terminated by the crease line 18 and an inner wall 28 contiguous with the wall 27 between the slit lines 14 interrupted by the openings 20. The said contiguous portions comprise the vertical ledges 23 and the sloped wall portions 24 forming a triangular projection above the plane of the walls 27 and 28.

In the next step the said extensions are provided with vertical creases 25 which divide them into opposite panels 30, 31, 32 and 33, each of which contains a shelve projection. Next the panel 22 is coated with adhesive films 26 in respective opposite corners and in line with said extensions. At this point the endmost U-shaped unit is severed from the main stock along the line in continuity with slit 19a to provide the partly completed unit employed in the following operations.

In the following operational sequence (Figs. 5 and 5a), the two U-shaped extensions of the panel 22 are folded on the crease lines 25 in such manner that the panels 30—31, 32—33, respectively, will be in superposed relationship and the outer wall 28 of panel 33 will be located over the glue pads 26 on the panel 22 and will be adhesively joined therewith. Next, the outer face of panel 22 will be provided with an adhesive film 35.

In the next operation (Figs. 6, 6a and 7, the latter taken along the line 7—7 of Fig. 6) the panel 22 is folded on the crease line 13 and the two halves are adhesively joined by the film 35, completing the fabrication. In the completed form, the coupler 10 assumes an L shape wherein the panels 30, 31, 32, 33 and 22 constitute the horizontal leg and the wall 22 the vertical leg projecting above said panels. The entire assembly constitutes a compact folded package convenient for shipping and storage. In the collapsed state (Figs. 6a and 7) the panels 30, 31, 32, 33 and 22 are in an abuttal arrangement forming a pair of elongated O-shaped contiguous circles.

To assemble the coupler 10 with the cartons 1 the respective panels 30 are forced apart causing the circles to expand and to assume the shape illustrated in Fig. 2 of a pair of rectangular frames joined by the handle wall 22. Next these frames are placed concentrically over the panels 4 of said cartons and the openings formed by the inner walls 28 of said frames are entered by said panels 4. As the frames are pressed down further the outer ridges of panels engage the slopes 24 and are forced apart by them until the shelves 23 are passed under the said ridges of panel 4 and the slopes 24 jump into the space provided by the openings 6 of said bottles. The disposition of said wall portions 23 and 24 therefore is such as to provide the required elasticity for that action.

Referring to Fig. 8, it will be noted that the panel 4 is square having uniform width and length and that the dimension line 7 constitutes the distance across the square formed by the outer extreme of the ridges above described and the dimension line 8 constitutes the distance across the square formed by the indentations 6. It will be further noted that the orbital disposition of the squares formed by the inner walls 28 of said frames will coincide with the dimensions 7 and correspondingly the orbit formed by the meeting lines of 23 and 24 conforms with the dimensions 8. In that assembled relation the shelves 23 serve as supports for the cartons 1 by means of the lower rims of panels 4 and the slopes 24 serve as confining members for the indentations 6 having a slight pressure engagement therewith. The assembled package is engaged by the handle portion 22 for convenient handling.

The assembly of cartons 1 and the coupler requires no particular skill and only a single motion of pressing the coupler over the cartons. A person of normal skill may become highly proficient in this operation without requiring any appurtenances or devices. In cases where the volume and speed requirements exceed human capacities the assembly operation may be accomplished by mechanical means comprising a supply magazine for the couplers 10, a feeding mechanism for extracting a single coupler and expanding it in concentric relation to the milk cartons and a pressure device for pushing the coupler into position shown in Fig. 8. The cost of such machinery would be relatively inexpensive due to the simplicity of the operation and at the same time it can be coordinated with the filling and packaging equipment of the dairy to do the coupling operation without delay and without additional labor.

The second form of my invention (Figs. 9 to 14) comprises two elements. Namely, the coupler band designated by numeral 40 and the spreader handle designated as 50.

The coupler band 40 is fabricated out of a paper web material approximately .006″ thickness supplied from a supply roll in the form of a continuous ribbon 41 which is divided into sectional lengths, each of which comprises a band 40, by the serrations, perforations, or lines of weakening 44. The space between serrations 44 coincides with the length required for a single coupler band 40.

Each panel 40 or band adjacent to the serrations 44 and on opposite faces is provided with an adhesive film 42 and 43, respectively. The characteristics of the adhesives 42 and 43 require special attention. It is applied in a fluid state comprising solvents and vehicles which serve to unite said adhesives with the fibres of the paper stock. After application the said solvents and vehicles are dissipated leaving a relatively dry film. This film will not adhere to a paper or similar surface but when the adhesive coated faces of 42 and 43 are brought into intimate overlapping contact, they will be immediately bonded to each other resisting any lateral pull. Examples of adhesives suitable for preparing adhesive films 42 and 43 include, among others, rubber latex adhesives. This type of substantially dry adhesive, which will for all practical purposes adhere only to itself, may be referred to as a dry self-sealing adhesive.

It will also be noted that the panels 40 of the ribbon 41 are folded on the serrations 44 in a zig-zag formation thereby preventing the adhesive films from contacting each other during shipping and storage. Furthermore, the outer faces of the sections 40 will be normally decorated with advertising messages which would be arranged to coincide in locations with corresponding panels 2 of the cartons 1. The serrations 44 and the zig-zag winding of the panels 40 therefore serve as control means for maintaining the uniform length of the coupler bands 40 and to register the location of the adhesive panels 42 and 43, also the location of the printed matter on the package, without requiring extraneous devices for these purposes.

As an alternative to the use of the two adhesive films 42 and 43, it may be desirable to employ a single adhesive film 42a. The latter, which could be a highly plasticized type of adhesive, or any of the type suitable for films 42 and 43, would be applied to one end of the coupler band only. To prevent said film 42a from adhering to the opposed surface thereto in the aforementioned folded zig-zag stack, said opposed surface may be treated with an anti-stick material such as paraffin, artificial and natural waxes, oils, etc. The said adhesive film, however, would effectively bond to the non-treated surface, normally occupied by film 43, when brought into intimate contact therewith when used in the manner described below, which description refers to the first form (i. e., as shown in Fig. 11) above mentioned.

The coupling operation consists of winding the band 40 around a pair of cartons 1 under tension, positioning the opposite adhesive panels 42 and 43 in superposed relation, pressing the said adhesive faces into intimate contact while maintaining said winding tension and finally tearing the assembled band 40 from the main stock at the serration 44.

It will be noted, that the tension applied at the time of winding and of adhesively securing the band 40 around the cartons 1 must be of the character to securely and firmly unite them to such degree that the combined unitary package may be lifted or carried by engaging either of said cartons at any part thereof without the hazard that its mate may shift or slip or essentially move from its position which it occupied before being lifted.

In this manner the security against dropping one of the containers when it is being moved or carried in this manner relies entirely upon said tension of the band 40. Consequently the selection of the adhesive film and the methods of winding and of joining the band around said containers must measure up to these requirements.

The combined advantages provided by the character of the adhesives on films 42 and 43, by the serrations 44 and by the zig-zag winding of the ribbon 41 extremely simplify the shipping and storage of the coupler 40 and the coupling operation. If a wet adhesive film were used which is applied coincidentally with the banding operation, it would necessitate provisions for a normal gluing apparatus. Furthermore, the joined sections of the band would require pressing means to maintain a tension of the band around the cartons until the adhesive films are sufficiently set to take over such function. Normally that period is quite prolonged and delaying and would be totally unsuited for manual operation.

For registering printed matter and maintenance of uniform length proper feeding and registering devices would be required and be again unsuitable for manual operation, unless the bands were supplied in precut lengths which is a decided disadvantage. From the aforesaid, it will now be evident that the coupler band of my invention provides the maximum simplicity and the minimum cost insofar as material selection, production cost and assembly cost are concerned. A person of normal skill may achieve high proficiency for manual operation without requiring any devices, not even a knife. Where the speed and volume requirements exceed human capacity, a mechanical device for winding the bands 40 around the cartons, for pressing the adhesive ends together and for tearing off the band would be extremely simple and inexpensive by reason of the inherent simplicity of the operations.

Whereas the band 40 by itself provides a coupled package of a pair of milk cartons, the addition of a grip handle corresponding to the handle portion 22 of the coupler 10 is desirable. Furthermore, there exists the hazard that in the event that the winding tension at the time of joining the adhesive pads 42 and 43 is relaxed or not sufficient a loose fitting band would result. In that case when the package is lifted by engaging one of the cartons only, the second carton may slip out of the band and be damaged in falling. For these reasons, I propose the handle spreader 50 (Figs. 9, 10, 12, 13 and 14).

The handle 50 is an optional and supplemental adjunct of the coupler band 40. It is fabricated out of a light weight paper board material 51 (approximately .014" thickness) supplied in a web form from a supply roll and fabricated in a continuous strip or ribbon by successive operational sequences until fully completed and cut off from the end of the strip. The web material 51 (Fig. 13) is in the initial operation provided with a plurality of parallel longitudinal creases 52, 53, 54, 55 and 57, said creases on either side of imaginary center line 58 being spaced equally therefrom. On each of the opposite halves of the panels formed by center line 58 are provided several slits 56 which are at right angles to said creases 52, 53, 54, 55 and 57.

The sections formed by slits 56 and crease line 57 are each further provided with parallel, longitudinal creases 59, 60 and 61 which are at right angles to slits 56. That portion of crease line 57 between slits 56 and opposite creases 59, 60 and 61 is then slit. Section 62, which is that portion of web 51 from crease line 55 to the longitudinal edge of the web and section 63, bounded by slits 56, crease 59 and the slit portion of crease 57, are provided with an adhesive film on the front face thereof.

In the succeeding operations (Fig. 14) adhesively coated sections 62 are bent inwardly on crease lines 53, 54 and 55 toward center line 58 and joined to the front face of web 51 to form triangular beads having ledge portions 64 and sloping wall portions 65 (see Fig. 14).

Then opposed sections 63 are bent in opposite directions on crease lines 59, 60 and 61 and joined to the front face of web 51 to form triangular beads having ledges 66 and sloping walls 67. The formation of these beads results in formation of openings 71.

In the following steps (Figs. 12 and 14) web 51 is provided on its back face from crease lines 57 to 53 with an adhesive film 68 and then the web 51 is folded on crease lines 52 so that the two halves of web 51 are adhesively joined by the film 68 and there is formed at one end of the adhesively joined sections a triangular bead having a ledge portion 69 and sloping wall portion 70 (see Fig. 12). To complete the fabrication, the ribbon is cut into individual sections conforming generally but not necessarily in length to the width of the panels 2 of the cartons 1.

Referring to Figs. 9 and 10, it will be noted that the spreader handle 50 is inserted between the two cartons 1 in such a manner that the triangular end portion formed by the several faces 64 and 65 occupies and conforms to the contour of the space provided by the indentations 6 of each carton. The triangular portions formed by the several faces 66 and 67 are spaced apart from the aforementioned triangular end portion a distance approximately equal to the thickness of the top panel 4 plus a double thickness of side panel 2 which is the total thickness of the crimped edge of the carton 1. It will thus be evident that the triangular portions formed by faces 66 and 67 in cooperation with the triangular end portion formed by faces 64 and 65 serve to lock the tightly banded cartons 1 in a single plane and at the same time prevent the two banded cartons 1 from assuming different levels. When the package is lifted by means of the handle 50 the weight of the package rests on ledge faces 64 with opposed ledge faces 66 tending to keep both cartons at an even level.

It shall be noted that the formation of the ledges or supporting beads 64 in cooperation with the contacting faces of the panels 4 and of the indentations 6 is such that the said ledges constitute a supporting wedge between the two containers. Thus when the package is lifted by means of engaging the handle at the finger opening 71 the weight of the contents applies a pressure onto the shelves 64 which in turn by means of a counterpressure applied to the said contacting faces tends to spread the two containers apart and thereby amplify the tension of the band 40 around the containers.

Another advantage of the cooperating action between faces 64 and 66 lies in the fact that when the packaged cartons are shipped there might be a tendency again for the cartons to assume different levels thereby placing upon the lower carton the weight load of both cartons of the package. Such a weight load could well cause a sufficient strain on the seams of the lower carton so as to result in a break in said seams and leakage therefrom. As a result of the formation of the triangular portions with faces 66 and 67 there is formed immediately above said triangular portions an opening 71, extending to the apex formed at the junction of faces 70. Said opening, which is that area bounded by slits 56, the slit portion of crease 57 and crease line 61 (see Fig. 13) serves as a finger opening for carrying the packaged cartons. The triangular top portion formed by faces 70 and ledge 69 forms the top boundary of the finger opening and it is the apex, at the junction of faces 70, of this triangular portion which resists the upward movement of the finger or other carrying means.

From the aforesaid, it is now evident that the handle 50 is a useful and complemental adjunct of the coupler band 40. It is made of inexpensive material. It may be produced at a low cost. It is not bulky for shipping and storage. It can be assembled with the package by a person of normal skill at an efficient rate purely by manual means. Where the requirements call for a speed and volume beyond human capacity, the apparatus for feeding said handles 50 to the package would be incorporated with the mechanism for applying the band 40 at a slight increase of cost and mechanism.

Having described my invention, it shall be noted that each form is capable of carrying out the objects of the invention. Both are made of inexpensive materials, are manufacturable at low cost and are suitable for either manual or mechanical assembly with the milk cartons for low cost packaging.

While I have illustrated and described the preferred embodiments of my invention, it is to be understood that these are capable of variation and modification and I therefore do not wish to be limited to the precise details set forth, and that any of such changes and alterations which may be made are within the scope of the appended claims, without departing from the spirit of the invention.

I claim:

1. In a twin package unit wherein substantially flat juxtaposed vertical side walls of the packages are held one against the other by coupling means, said juxtaposed side walls being formed with opposed transverse indentations each having a substantially flat horizontal upper wall, and a handle having a lower portion interposed between the coupled packages, said handle portion being provided with projections extending from opposite sides thereof into said indentations in the package walls to support said unit, the improvement wherein said handle member comprises a pair of connected vertical walls of sheet material with bottom marginal portions of said handle walls extending in opposite directions outwardly and upwardly, then horizontally inwardly, and then downwardly against the handle and being there secured to form lower beads substantially triangular in cross section and having substantially flat upper ledge portions in engagement with said flat upper walls of the package indentations to provide a maximum area of supporting engagement between said handle ledges and flat upper walls of said package indentations.

2. The twin package unit of claim 1 wherein the walls of said triangular bead conform to and bear against the walls of said indentations to provide a maximum engagement therewith.

3. The twin package unit of claim 1 wherein portions of the vertical walls on opposite sides of said handle member above the tops of the packages extend in opposite directions outwardly and downwardly, then horizontally inwardly, and then upwardly against the handle wall and are there secured to form upper beads substantially triangular in cross section and having substantially flat lower faces in engagement with the upper ends of the packages to cooperate with said lower beads to prevent vertical displacement of said handle from its package supporting position.

4. The twin package unit of claim 1 wherein the coupling means comprises a band wound tightly around the exposed vertical side walls of said packages with its ends overlapping, the opposing faces of said overlapping ends being coated with films of self-sealing adhesive pressed together to join them securely.

5. In a twin package unit wherein substantially flat juxtaposed vertical side walls of the packages are held one against the other by coupling means, said juxtaposed side walls being formed with opposed horizontal transverse indentations, and a handle having a lower portion interposed between the coupled packages, said handle portion being provided with projections extending from opposite sides thereof into said indentations in the package walls to support said unit, the improvement wherein said coupling means comprises a band wound tightly around the exposed vertical side walls of said packages with its ends overlapping, the opposing faces of said overlapping ends being coated with films of self-sealing adhesive and pressed together to join them securely, and said handle comprises lower portions on opposite sides thereof extending outwardly, upwardly, inwardly, and then downwardly against said handle and there secured to form oppositely projecting beads extending into engagement in said package indentations to support said unit, and upper portions of said handle member above the tops of the packages extending outwardly in opposite directions, downwardly and then upwardly against the sides of the handle and there secured to form projecting beads which engage the upper ends of the coupled packages to cooperate with said lower beads on the handle to prevent vertical displacement of said handle from its package supporting position.

References Cited in the file of this patent

UNITED STATES PATENTS

| | | |
|---|---|---|
| D. 162,515 | Burge | Mar. 20, 1951 |
| 689,667 | Blakeslee | Dec. 24, 1901 |
| 1,943,022 | Koster | Jan. 9, 1934 |
| 2,006,475 | O'Reilly | July 2, 1935 |
| 2,025,522 | Myers | Dec. 24, 1935 |
| 2,192,268 | Lane | Mar. 5, 1940 |
| 2,252,235 | Snelling | Aug. 12, 1941 |
| 2,323,342 | McManus et al. | July 6, 1943 |
| 2,514,858 | Gray | July 11, 1950 |
| 2,522,950 | Keith | Sept. 19, 1950 |
| 2,603,923 | Chidsey | July 22, 1952 |
| 2,646,911 | Holmberg | July 28, 1953 |
| 2,675,264 | Vander Lugt | Apr. 13, 1954 |
| 2,694,596 | Greenlaw et al. | Nov. 16, 1954 |